US009350229B2

(12) United States Patent
Aldinger et al.

(10) Patent No.: US 9,350,229 B2
(45) Date of Patent: May 24, 2016

(54) SYSTEM AND METHOD OF CONTROLLING AN INVERTER BASED ON A CALCULATED CAPACITANCE OF A DC LINK CAPACITOR

(71) Applicant: Robert Bosch GmbH, Stuttgart (DE)

(72) Inventors: Stefan Aldinger, Bad Wimpfen (DE); Jochen Kilb, Sersheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/619,575

(22) Filed: Feb. 11, 2015

(65) Prior Publication Data

US 2015/0236616 A1    Aug. 20, 2015

(30) Foreign Application Priority Data

Feb. 14, 2014  (DE) .......................... 10 2014 202 717

(51) Int. Cl.
| | |
|---|---|
| *H02M 1/32* | (2007.01) |
| *H02M 7/537* | (2006.01) |
| *H02M 7/538* | (2007.01) |
| *H02M 7/48* | (2007.01) |

(52) U.S. Cl.
CPC ........ *H02M 1/32* (2013.01); *H02M 7/48* (2013.01); *H02M 7/537* (2013.01); *H02M 7/538* (2013.01); *H02M 2001/327* (2013.01)

(58) Field of Classification Search
CPC ... H02M 1/32; H02M 2001/327; H02M 7/48; H02M 7/537; H02M 7/5387
USPC .............................. 702/65; 324/548, 658–690
See application file for complete search history.

(56) References Cited

U.S. PATENT DOCUMENTS

| | | | |
|---|---|---|---|
| 5,497,095 A * | 3/1996 | Ueyama et al. ............... | 324/537 |
| 2005/0231171 A1 | 10/2005 | Kato et al. | |
| 2009/0051307 A1* | 2/2009 | Katsuyama et al. .......... | 318/472 |
| 2014/0002104 A1 | 1/2014 | Yang | |
| 2014/0032145 A1 | 1/2014 | Yoo | |
| 2014/0092655 A1* | 4/2014 | Igarashi et al. ............ | 363/56.03 |
| 2015/0130273 A1* | 5/2015 | Govindaraj et al. ............ | 307/10 |

* cited by examiner

*Primary Examiner* — Timothy J Dole
*Assistant Examiner* — Ishrat Jamali
(74) *Attorney, Agent, or Firm* — Michael Best & Friedrich LLP

(57) ABSTRACT

A system, comprising a control regulation system, an inverter, a DC link capacitor, which is coupled to input connections of the inverter, at least one control apparatus, which is coupled to semiconductor switches of a half-bridge of the inverter, wherein the control apparatus is configured to actuate the semiconductor switch on the basis of a control signal from the control regulation system, at least one temperature sensor, which is configured to determine a change in temperature of the semiconductor switches in the half-bridge of the inverter, and a voltage sensor, which is configured to determine the voltage at the DC link capacitor is disclosed.

7 Claims, 2 Drawing Sheets

SYSTEM AND METHOD OF CONTROLLING AN INVERTER BASED ON A CALCULATED CAPACITANCE OF A DC LINK CAPACITOR

BACKGROUND OF THE INVENTION

The invention relates to a system comprising a control apparatus for semiconductor switches of an inverter and to a method for actuating an inverter, in particular in a diagnostics operating mode for a connected DC link.

Electric and hybrid vehicles often have power electronics circuit components in the drive system between the traction battery and the electric machine which are generally in the form of DC link converters. In this case, a DC link is used as coupling element between the traction battery and an inverter which can be actuated in order to transfer electric power from the DC link to the electric machine.

Inverters can be in the form of, for example, a full-bridge circuit comprising a number of bridge branches, each having two semiconductor switches. In this case, the semiconductor switches in the bridge branches which are connected to a first output connection of the DC link are each referred to as high-side switches and the semiconductor switches in the bridge branches which are connected to the second output connection of the DC link are each referred to as low-side switches. In this case, for example, IGBT modules (insulated-gate bipolar transistors) with a diode connected back-to-back in parallel or MOSFETs (metal-oxide field-effect transistors) can be used as semiconductor switches.

In such systems, it is desirable to be able to check the voltage storage elements used in the DC link, such as DC link capacitors, for degradation effects owing to aging or overloading. Such degradation effects can under certain circumstances result in restrictions to the performance of the storage elements and, under certain circumstances, also to failure of the entire system.

The publication US 2005/0231171 A1 discloses an electric drive system comprising an electric motor, a pulse-controlled inverter and a DC link capacitor. The DC link capacitor can be discharged in a controlled manner via a corresponding switch operation of the pulse-operated inverter.

SUMMARY OF THE INVENTION

The present invention provides, in accordance with one aspect, a system, comprising a control regulation system, an inverter, a DC link capacitor, which is coupled to input connections of the inverter, at least one control apparatus, which is coupled to semiconductor switches of a half-bridge of the inverter, wherein the control apparatus is configured to actuate the semiconductor switch on the basis of a control signal from the control regulation system, at least one temperature sensor, which is configured to determine a change in temperature of the semiconductor switches in the half-bridge of the inverter, and a voltage sensor which is configured to determine the voltage at the DC link capacitor. In this case, the control regulation system is configured to generate the control signal as a train of control signal pulses with an adjustable pulse length, with the result that the semiconductor switches in the half-bridge of the inverter are not completely conductive during the pulse length on actuation in accordance with the control signal. Furthermore, the control regulation system is configured to calculate a present capacitance of the DC link capacitor on the basis of a determined change in temperature of the temperature sensor and a determined change in voltage of the voltage sensor during actuation of the semiconductor switch in the half-bridge of the inverter in accordance with the control signal.

In accordance with a further aspect, the present invention provides a method for actuating an inverter, comprising the steps of actuating semiconductor switches in a half-bridge of the inverter by means of a control signal which has a train of control signal pulses with an adjustable pulse length so that the semiconductor switches in the half-bridge of the inverter are not completely conductive during the pulse length on actuation in accordance with the control signal, determining a voltage of a DC link capacitor feeding the inverter during the actuation of the semiconductor switches, determining a change in temperature of the semiconductor switches in the half-bridge of the inverter during actuation of the semiconductor switches and calculating a present capacitance of the DC link capacitor on the basis of the determined change in temperature and the determined voltage.

One concept of the present invention consists in at least partially discharging a DC link capacitor which feeds DC voltage to an inverter via the semiconductor switches of the inverter in a linear or active operating mode. This discharge results in electrical power losses and associated heating of the semiconductor switches in the linear or active operating mode of the semiconductor switches which can be set in relation to the voltage losses at the DC link capacitor. Owing to the fact that, by virtue of a thermal model of the semiconductor switches, it can be concluded that there is thermal energy that is converted during the discharge, it is possible to draw conclusions on the presently available capacitance of the DC link capacitor.

One advantage of the invention consists in that a diagnostics operating mode can be provided by means of the system by virtue of the operating mode of "incipient clocking" of the semiconductor switches, which diagnostics operating mode provides a continuous possibility for checking for possible degradation effects of the DC link capacitor. In quiescent modes of the system in which no further consumer needs to be fed by the DC link, therefore, rapid and effective determination of the present capacitance of the DC link capacitor can be implemented. Therefore, the threat of a power dip in the DC link and therefore possible failures or defects can be identified in good time. The risk of failure of the entire system can thus be reduced.

It is particularly advantageous in this case that firstly no further circuit components need to be installed for discharging the DC link capacitor, which saves on space and manufacturing costs. Secondly, the semiconductor switches are in any case connected thermally very well to the surrounding environment, with the result that discharge of the DC link capacitor via the inverter does not cause overheating of the entire system.

Advantageously, in the event that losses in capacitance are established at the DC link capacitor, countermeasures can be taken which can extend the life of the DC link capacitor, for example a reduction in the peak loading of the DC link or a general reduction in the maximum power of the system. In addition, operational parameters of the system can be matched in order to avoid overvoltages in the system and in particular at the DC link capacitor in the future.

In accordance with one embodiment of the system according to the invention, the control apparatus can have an actuation circuit which is configured to generate a driver signal depending on the switching signal generated by the control regulation system, and a driver circuit, which is coupled between the actuation circuit and a control input of the semiconductor switches, and which is configured to receive the driver signal, to generate a switch control signal depending on the driver signal, and to feed the switch control signal into the control inputs of the semiconductor switches.

In accordance with a further embodiment of the system according to the invention, the actuation circuit can be configured to generate the driver signal as a train of driver signal pulses with an adjustable pulse length so that the semiconductor switches are not completely conductive during the pulse length on actuation by the switch control signal.

In accordance with a further embodiment of the system according to the invention, the pulse length can be adjustable such that the semiconductor switches have a predetermined current value on actuation by the switch control signal.

In accordance with a further embodiment of the system according to the invention, the semiconductor switches can be IGBT switches.

In accordance with a further embodiment of the system according to the invention, the temperature sensor can be configured to determine the temperature of the semiconductor switches in the half-bridge of the inverter at the beginning and at the end of the train of control signal pulses, and the voltage sensor can be configured to determine the voltage at the DC link capacitor at the beginning and at the end of the train of control signal pulses. This operating mode enables a defined qualitative periodic comparison of the performance of the DC link capacitor with an initial state, for example the new state or a delivery state. By repetition of the measurements at periodic intervals and storing of the respectively determined values, it is possible to draw a conclusion in respect of a reduced DC link capacitance in the case of a marked deviation of the value over the course of time.

In accordance with a further embodiment of the system according to the invention, the system can furthermore comprise an n-phase electric machine, where n≥1, which is coupled to output connections of the inverter.

BRIEF DESCRIPTION OF THE DRAWINGS

Further features and advantages of embodiments of the invention result from the description below with reference to the attached drawings.

DETAILED DESCRIPTION

Figure 1:
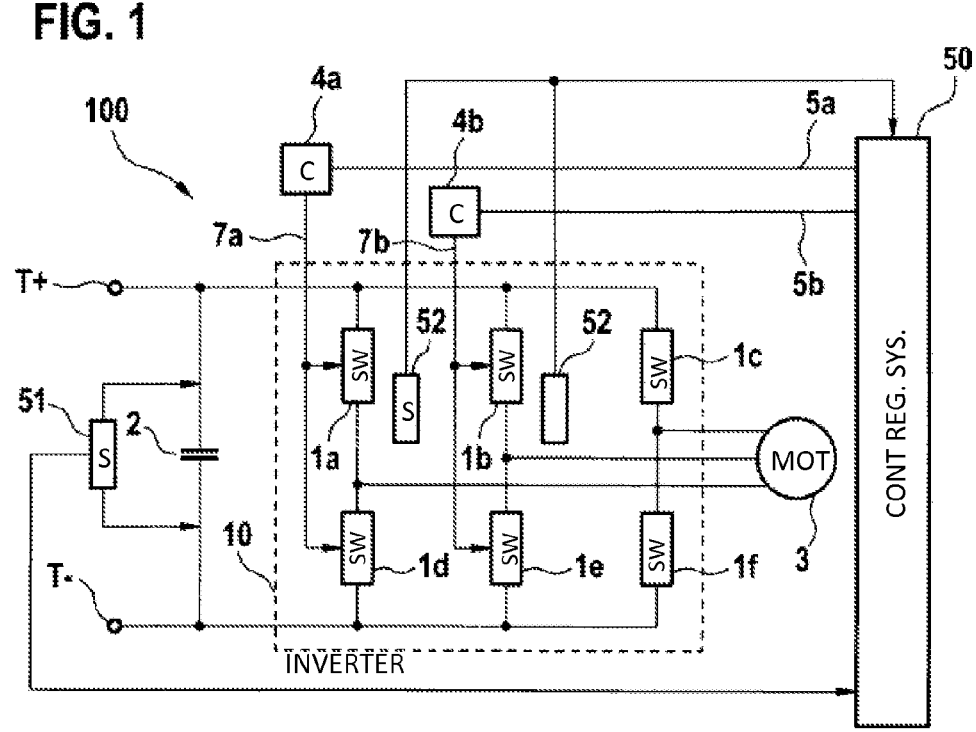
FIG. 1 shows a schematic illustration of an electric drive system of a vehicle in accordance with one embodiment of the invention.

FIG. 1 shows a schematic illustration of a system 100, for example an electrical drive system 100 of a vehicle. The electric drive system 100 comprises two input connections T+ and T−, to which voltage can be supplied, for example, by an energy storage device such as a high-voltage battery or a traction battery of the vehicle. The input connections T+ and T− are connected to a DC link, which has a DC link capacitor 2. The DC link capacitor 2 is connected to input connections of an inverter 10, for example a pulse-controlled inverter 10, via output connections. The DC link converter illustrated in FIG. 1 comprising the DC link capacitor 2 and the converter 10 is in the form of a three-phase converter, by way of example, i.e. the inverter 10 comprises three bridge branches, each having two semiconductor switches. The first bridge branch comprises, for example, the semiconductor switches 1a and 1d, the second bridge branch comprises, for example, the semiconductor switches 1b and 1e, and the third bridge branch comprises, for example, the semiconductor switches 1c and 1f. In this case, the semiconductor switches 1a, 1b, 1c on one bridge side are referred to as high-side switches, and the semiconductor switches 1d, 1e, 1f on the other bridge side are referred to as low-side switches. It should be clear in this case that any other number of bridge branches or phases of the DC link converter is likewise possible and that the designation of the semiconductor switches 1a to 1f as high-side switches and low-side switches is only selected by way of example.

The semiconductor switches 1a to 1f illustrated in FIG. 1 can in this case have field-effect transistors (FETs), for example. In a possible embodiment, the semiconductor switches are each IGBTs (insulated-gate bipolar transistors); however, it is likewise possible to provide other semiconductor switches with a corresponding form, for example in the form of JFETs (junction field-effect transistors) or MOSFETs (metal oxide semiconductor field-effect transistors). If the semiconductor switches 1a to 1f have IGBT switches, provision can be made for a diode (not illustrated in FIG. 1 for reasons of clarity) to be connected back-to-back in parallel with each of the IGBT switches.

The electric drive system 100 furthermore has a control regulation system 50, which is configured to generate switching signals 5a and 5b which encode switching actuation of the semiconductor switches. For reasons of clarity, only the switching signals for the semiconductor switches 1a, 1b, 1d and 1e are shown, wherein corresponding signals can be generated for the semiconductor switches 1c and 1f. The switching signals can in this case have, for example, a low logic level if the semiconductor switches are intended to be open and a high logic level if the semiconductor switches are intended to be closed. The control regulation system 50 feeds the switching signals 5a and 5b into corresponding control apparatuses 4a and 4b, which are each responsible for the actuation of the semiconductor switches in a half-bridge of the inverter 10.

The system 100 furthermore comprises a voltage sensor 51, which is coupled to the control regulation system 50 and which is configured to determine the voltage present at the DC link capacitor 2 and to transmit this voltage to the control regulation system for further processing. In addition, the system 100 comprises one or more temperature sensors 52, which are each arranged in the vicinity of one of the half-bridges of the inverter 10 and which are configured to determine the temperature of the half-bridge or of the semiconductor switches 1a to 1f assigned to the half-bridge. By way of example, FIG. 1 shows two temperature sensors 52, but any other number of temperature sensors 52 can likewise be implemented for one, more than one or all of the half-bridges of the inverter 10.

The coupling of the control apparatuses 4a, 4b to the assigned semiconductor switches will be explained below. The control apparatus 4a, 4b has a control output, via which a control signal 7a, 7b can be output to a control input of the semiconductor switches 1a, 1b, 1d, 1e in order to control the operation of the semiconductor switches 1a, 1b, 1d, 1e. The control apparatus 4a, 4b can, for example, via measurement lines measure signals, for example current signals, which indicates an instantaneous current intensity through the semiconductor switch, or voltage signals, which indicate an instantaneous voltage at a connection of the semiconductor switch, for example the collector connection of an IGBT switch.

Figure 2:
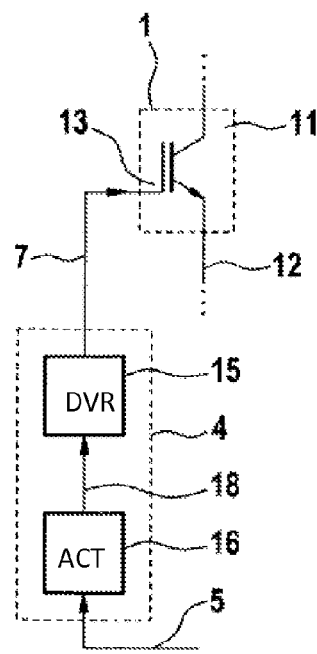
FIG. 2 shows a schematic illustration of a control apparatus for a semiconductor switch in accordance with a further embodiment of the invention.

FIG. 2 shows a schematic illustration of an exemplary control apparatus 4 for a semiconductor switch 1. In particular, an exemplary embodiment of the control apparatuses 4a and 4b and of the associated semiconductor switches 1a, 1b, 1d, 1e is shown in greater detail in FIG. 2. The reference symbols used in FIG. 2 can in this case each be provided with the letters a and b in order to identify the respective components of the electric drive system 100 shown in FIG. 1.

In general, the control apparatuses 4 shown in FIG. 2 are used for actuating a semiconductor switch 1, in particular a semiconductor switch 1 of an inverter, such as of the inverter 10 in FIG. 1, for example. The semiconductor switch 1 is shown, by way of example, in FIG. 2 as an IGBT switch, which has a collector connection 11, an emitter connection 12 and a gate or control input 13. In addition, a current measurement signal can be conducted away via a current sensor output 14 (not explicitly shown), which current measurement signal correlates with the current intensity of a current flowing through the IGBT switch 1 at that time. The IGBT switch 1 can be actuated via the control input 13 by application of a corresponding control signal 7 with a specific voltage level in various operating modes. In a switching operating mode, the IGBT switch 1 can only be operated in an off-state region or a saturation region, i.e. the IGBT switch 1 is either completely off or completely conducting. In a linear or active operating mode, on the other hand, the IGBT switch 1 can be operated in an amplification region, i.e. the current intensity of a current through the IGBT switch 1 scales proportionally or substantially proportionally to the voltage present at the control connection.

In the exemplary embodiment shown in FIG. 2, the control apparatus 4 has an actuation circuit 16, which is configured to generate a driver signal 18 depending on a switching signal 5 generated by the control regulation system 50 of an inverter 10. In this case, in a conventional switching operating mode of the converter 10, the driver signal 18 can correspond substantially to the switching signal 5. The switching signal 5 can have, for example, a high logic level if the IGBT switch 1 is intended to be closed and a low logic level if the IGBT switch 1 is intended to be opened. Any other actuation logic is of course likewise possible in this case. In the conventional switching operating mode, provision is made for the IGBT switch 1 to either be completely off or completely conducting so that the switching signal 5 maintains the respective logic level for a preset time span.

Furthermore, the control apparatus 4 comprises a driver circuit 15, which is coupled between the actuation circuit 16 and a control input 13 of the IGBT switch 1 and which is configured to receive the driver signal 18 and to generate a switch control signal 7 depending on the driver signal 18, which switch control signal 7 actuates the IGBT switch 1. The switch control signal 7 is then fed into the control input 13 of the IGBT switch 1 via the driver circuit 15. For this purpose, the driver circuit 15 can have, for example, an internal control or gate resistance, via which the amplification of the driver signal 18 for generating the switch control signal 7 is adjustable.

In a diagnostics mode of the inverter 10, it may be necessary or desirable to perform discharge of the DC link capacitor 2. An IGBT switch 1 can be "incipiently clocked" selectively, i.e. can be actuated in a pulsed operating mode in which actuation pulses are fed into the control input 13 of the IGBT switch 1, the duration of said actuation pulses being so short that the IGBT switch 1 is not yet switched so as to be completely conductive but, for a short period of time, is in a transition state between the off state and the conducting state. During this time, energy from the DC link capacitor 2 can be converted into heat as a current flows through the IGBT switch 1 and thus the voltage at the DC link or the energy at the DC link can be decayed quickly.

This makes it possible in particular to set up a diagnostics operating mode in an inverter 10 actuated in such a way, as a result of which at least partial discharge of a DC link capacitor feeding the inverter 10, for example the DC link capacitor 2, can take place in an advantageous manner. In this case, it is particularly advantageous that the already existing components of the inverter 10 can be used for discharge without additional circuits or discharge elements such as switchable resistors or the like needing to be installed.

In order to implement this operating mode, the actuation circuit 16 can be configured to generate the driver signal 18 as a train of driver signal pulses with a predetermined and adjustable pulse length, with the result that the IGBT switch 1 is not completely conductive on actuation by the switch control signal 7 during the pulse length. This pulse length can be short with respect to the actuation duration in a conventional control operating mode of the IGBT switches 1. For example, the switching duration of an IGBT switch 1 during which the IGBT switch 1 is kept closed or open during normal operation, can be approximately 100 µs. The pulse length can in this case be a few µs, for example between 0.2 µs and 5 µs. In this case, the pulse length can be dependent on the physical parameters of the IGBT switch 1 and the driver circuit 15.

The pulse length of the driver signal pulses can be adjusted such that the DC link voltage decreases to a predefined degree or the current intensity through the IGBT switch 1 assumes a predetermined value or does not exceed a predetermined threshold value. As a result, an overload of the IGBT switch 1 and therefore possible damage can be avoided.

Advantageously, during such discharge via the semiconductor switches in a half-bridge of the inverter 10, in the diagnostics operating mode the temperature sensor 52 responsible in each case for the incipiently clocked semiconductor switches can determine a change in temperature of the semiconductor switches 1 in the half-bridge of the inverter 10 and the voltage sensor 51 can determine a change in voltage at the DC link capacitor 2. The measured values determined are then evaluated by the control regulation system 50 in order to calculate a present capacitance of the DC link capacitor 2 on the basis of the determined change in the temperature of the temperature sensor 52 and determined change in voltage of the voltage sensor 51.

The power losses caused by the short-circuit current in the linear or active operating mode of the semiconductor switches result in a temperature rise in the semiconductor switches. By virtue of a known thermal model of the semiconductor switches or the power module having known effective thermal capacitances and thermal resistances or via known transmission functions, conclusions can be drawn in respect of the thermal energy $\Delta WH$ converted during the discharge of the DC link capacitor in the semiconductor switches or in the power module. If the voltage values UB and UE are now determined at the beginning and at the end of the discharge operating mode of the DC link capacitor, it is possible to calculate the quantity of energy $\Delta WC$ drawn from the DC link capacitor via the following relationship, for example:

$$\Delta WC = 0.5 * C * (UB^2 - UE^2) \quad [1].$$

If it can still be assumed that the quantity of energy $\Delta WC$ drawn from the DC link capacitor has been completely converted into thermal energy $\Delta WH$ via the semiconductor switches, the capacitance C of the DC link capacitor can be calculated:

$$C = 2 * \Delta WH * (UB^2 - UE^2)^{-1} \quad [2].$$

Given the same boundary conditions for the discharge operating mode, the diagnostics mode can be repeated periodically in order to match the value for the temperature increase which is set to previously determined values which are stored in the control regulation system 50 for the temperature increase (setpoint values or initial values) in the case of fixedly defined DC link voltages and fixedly defined discharge durations. In the case of marked deviations between the two values or in the case of identification of a declining trend, it can be concluded that the DC link capacitance is decreasing. Thereupon, corresponding countermeasures can be taken, for example a power reduction of the entire system, a reduction in the peak voltage at the DC link, an output of error or warning signals and/or storage of log entries in a diagnostics store of the vehicle using the drive system.

Figure 3:
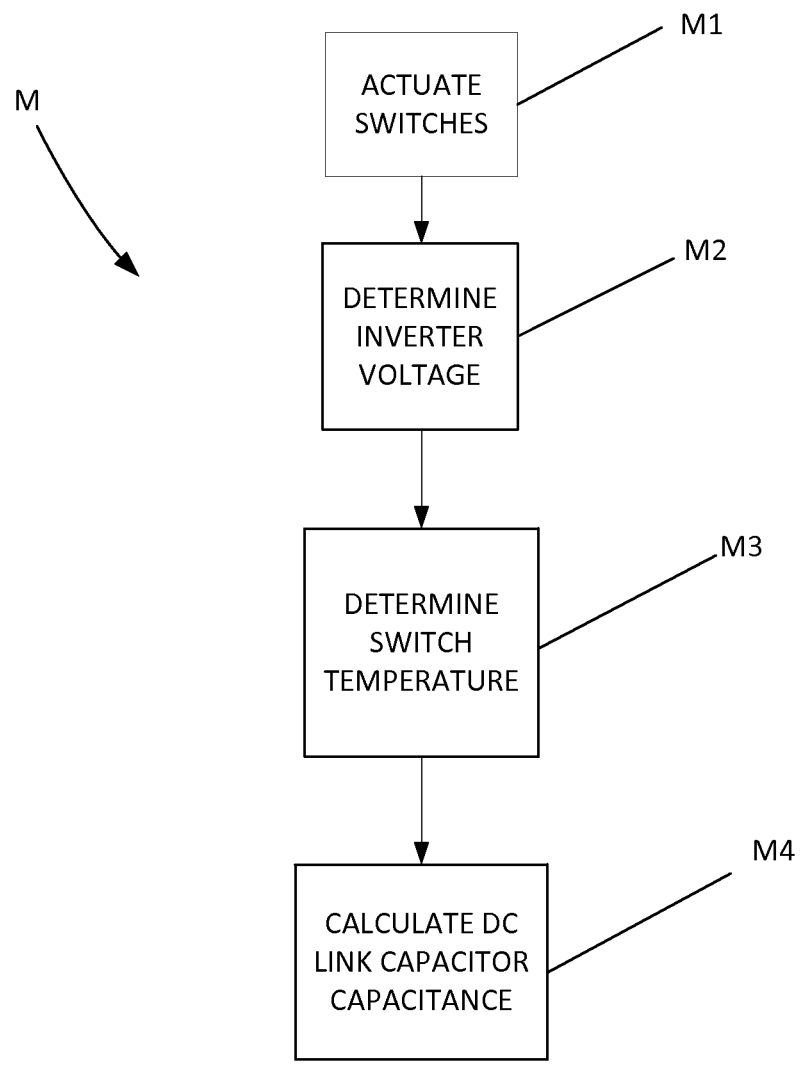
FIG. 3 shows a schematic illustration of a method for actuating an inverter in accordance with a further embodiment of the invention.

FIG. 3 shows a schematic illustration of a method M for actuating an inverter, in particular an inverter 10 in the electric drive system 100 (illustrated in FIG. 1) of an electrically operated vehicle. The method M comprises, in a first step M1, actuating semiconductor switches in a half-bridge of the inverter 10 using a control signal 5, which has a train of control signal pulses with an adjustable pulse length, so that the semiconductor switches in the half-bridge of the inverter 10 are not completely conductive on actuation in accordance with the control signal 5 during the pulse length. During the actuation of the semiconductor switches, in steps M2 and M3 the voltage of a DC link capacitor 2 feeding the inverter 10 and a change in temperature of the semiconductor switches in the half-bridge of the inverter 10 can be determined. On the basis of the determined change in temperature and the determined voltage, a present capacitance of the DC link capacitor 2 can then be calculated in step M4, in particular on the basis of the relationships in equations [1] and [2] explained further above. In this case, the temperature of the semiconductor switches in the half-bridge of the inverter 10 and the voltage at the DC link capacitor 2 can each be determined at the beginning and at the end of the train of control signal pulses in order to be able to determine a temperature difference and a voltage difference.

The method 30 can in principle be implemented in any operating mode of the inverter 10. In particular, the method 30 can be implemented in a conventional normal operating mode of the inverter 10, in which no further storage element for electrical energy is coupled to the DC link and if no further consumer draws electrical energy from the DC link. In this case, in a freewheeling mode or in the regulation operating mode, for example, one or more of the half-bridges with the semiconductor switches 1a to 1f, which should be in a closed state, can be actuated in pulsed fashion during this time span. As a result, by virtue of the evaluation of the temperature increase and the change in voltage at the DC link capacitor 2, it is possible to check whether the capacitance of the DC link capacitor 2 is within a plausible range for the DC link capacitor 2. Therefore, it is possible to ensure at any point in time during the operation of the inverter 10 that the DC link capacitor 2 is functioning without any problems.

The invention claimed is:

1. A system (100), comprising:
a control regulation system (50);
an inverter (10);
a DC link capacitor (2), which is coupled to input connections of the inverter (10);
at least one control apparatus (4), which is coupled to semiconductor switches (1) of a half-bridge of the inverter (10), wherein the control apparatus (4) is configured to actuate the semiconductor switch (1) on the basis of a control signal (5) from the control regulation system (50);
at least one temperature sensor (52), which is configured to determine a change in temperature of the semiconductor switches (1) in the half-bridge of the inverter (10); and
a voltage sensor (51), which is configured to determine the voltage at the DC link capacitor (2),
wherein the control regulation system (50) is configured to generate the control signal (5) as a series of control signal pulses, a pulse length of the control signal pulses having a duration that results in the semiconductor switches (1) in the half-bridge of the inverter (10) not becoming completely conductive during the control signal pulse,
wherein the control regulation system (50) is configured to calculate a present capacitance of the DC link capacitor (2) on the basis of a determined change in temperature of the temperature sensor (52) between the beginning and the end of the control signal pulse and a determined change in voltage of the voltage sensor (51) between the beginning and the end of the control signal pulse, and
wherein the operation of the system (100) is altered if the calculated capacitance of the DC link capacitor (2) indicates the DC link capacitor (2) is not functioning properly.

2. The system (100) according to claim 1, wherein the control apparatus (4) has:
an actuation circuit (16), which is configured to generate a driver signal (18) depending on the switching signal (5) generated by the control regulation system (50);
a driver circuit (15), which is coupled between the actuation circuit (16) and a control input (13) of the semiconductor switches (1), and which is configured to receive the driver signal (18), to generate a switch control signal (7) depending on the driver signal (18), and to feed the switch control signal (7) into the control inputs (13) of the semiconductor switches (1).

3. The system (100) according to claim 2, wherein the actuation circuit (16) is configured to generate the driver signal (18) as a series of driver signal pulses with an adjustable pulse length so that the semiconductor switches (1) are not completely conductive during the pulse length on actuation by the switch control signal (7).

4. The system (100) according to claim 3, wherein the pulse length is adjustable such that the semiconductor switches (1) have a predetermined current value on actuation by the switch control signal (7).

5. The system (100) according to claim 1, wherein the semiconductor switches (1) are IGBT switches.

6. The system (100) according to claim 1, further comprising:
an n-phase electric machine (3), where n≥1, which is coupled to output connections of the inverter (10).

7. A method (M) for actuating an inverter (10), comprising the following steps:
actuating (M1) semiconductor switches (1a, . . . , 1f) in a half-bridge of an inverter (10) by a control signal (5) which has a series of control signal pulses having a pulse length such that the semiconductor switches (1a, . . . 1f) in the half-bridge of the inverter (10) are not completely conductive during an on actuation of the pulse length in accordance with the control signal (5);
determining (M2) a voltage of a DC link capacitor (2) feeding the inverter (10) between the beginning and the end of the actuation of the semiconductor switches (1a, . . . , 1f);

determining (M3) a change in temperature of the semiconductor switches (1a, . . . , 1f) in the half-bridge of the inverter (10) during between the beginning and the end of the actuation of the semiconductor switches (1a, . . . , 1f);

calculating (M4) a present capacitance of the DC link capacitor (2) on the basis of the determined change in temperature and the determined voltage; and altering the actuation of the inverter (10) if the calculated capacitance of the DC link capacitor (2) indicates the DC link capacitor (2) is not functioning properly.

* * * * *